(12) United States Patent
Pokorski

(10) Patent No.: US 9,988,486 B2
(45) Date of Patent: Jun. 5, 2018

(54) CURING AGENT FOR EPOXY RESINS

(71) Applicant: P-Brain Pty Ltd, Bulimba, Brisbane (AU)

(72) Inventor: Andrzej Pokorski, Brisbane (AU)

(73) Assignee: P-BRAIN PTY LTD, Brisbane (AU)

( * ) Notice: Subject to any disclaimer, the term of this patent is extended or adjusted under 35 U.S.C. 154(b) by 311 days.

(21) Appl. No.: 14/780,207

(22) PCT Filed: Mar. 20, 2014

(86) PCT No.: PCT/AU2014/000299
§ 371 (c)(1),
(2) Date: Sep. 25, 2015

(87) PCT Pub. No.: WO2014/153593
PCT Pub. Date: Oct. 2, 2014

(65) Prior Publication Data
US 2016/0039969 A1  Feb. 11, 2016

(30) Foreign Application Priority Data
Mar. 28, 2013 (AU) .................................. 2013901077

(51) Int. Cl.
| | | |
|---|---|---|
| *C08G 59/02* | (2006.01) | |
| *C08G 59/18* | (2006.01) | |
| *C09D 163/00* | (2006.01) | |
| *C08L 63/00* | (2006.01) | |
| *C08K 5/06* | (2006.01) | |

(52) U.S. Cl.
CPC .............. *C08G 59/02* (2013.01); *C08G 59/18* (2013.01); *C08G 59/184* (2013.01); *C08G 59/186* (2013.01); *C08K 5/06* (2013.01); *C08L 63/00* (2013.01); *C09D 163/00* (2013.01)

(58) Field of Classification Search
CPC ...................................................... C08G 59/02
See application file for complete search history.

(56) References Cited

U.S. PATENT DOCUMENTS

| 2008/0045659 | A1* | 2/2008 | Hakuya ................ C08G 59/182 525/190 |
| 2008/0255271 | A1 | 10/2008 | Raymond |
| 2010/0286345 | A1* | 11/2010 | Sato ..................... C08G 59/184 525/523 |
| 2011/0195195 | A1* | 8/2011 | Geisberger ........... C08G 59/184 427/427.5 |

FOREIGN PATENT DOCUMENTS

| JP | 2004277484 A | 10/2004 |
| WO | 1997033931 A1 | 9/1997 |
| WO | 2009016162 A1 | 2/2009 |
| WO | 2009080209 A1 | 7/2009 |

OTHER PUBLICATIONS

Meath, Allan R. "Epoxy resin adhesives." Handbook of Adhesives. Springer, Boston, MA, 1990. 347-358.*
International Search Report and Written Opinion dated May 22, 2014 for corresponding application No. PCT/AU2014/000299.

* cited by examiner

*Primary Examiner* — Megan McCulley
(74) *Attorney, Agent, or Firm* — Wegman, Hessler & Vanderburg

(57) ABSTRACT

Amine terminated curing agents for curing water based epoxy resins wherein the equivalent weight of active hydrogen is from 85 g to 105 g obtained by reacting polyamine with salicylic acid and subsequently reacting with epoxy resin. The invention also relates to curing compositions, curable systems, and cured compositions and coatings including such curing agents. The cured coatings find application as coatings for floor surfaces, including surfaces where food use approval is required. The cured coatings have particular application for coating the flooring of shipping containers but the use is not so limited.

12 Claims, No Drawings

CURING AGENT FOR EPOXY RESINS

CROSS-REFERENCE TO RELATED APPLICATIONS

This application claims the priority filing benefit of International PCT Application PCT/AU2014/000299 filed Mar. 20, 2014 and published under PCT 21(2) in the English language, and Australian Patent Application No. 2013901077 filed Mar. 28, 2013. Each of the above listed applications is incorporated herein by reference.

FIELD OF INVENTION

The present invention relates to curing agents for epoxy resins. In particular the invention relates to improved curing agents for water based epoxy resins. The invention also relates to curing compositions, curable systems, coating kits, cured compositions and coatings including such curing agents. The cured compositions find application as coatings for substrates such as flooring of shipping containers, but the use is not so limited.

BACKGROUND OF THE INVENTION

Goods are generally transported between locations by ship, train or truck. Many types of freight are conveniently housed in reusable shipping containers for transportation. A common form of shipping container is a metal box-shaped container with doors for access. Although the size and shape of shipping containers varies, a commonly used shipping container measures approximately 20 feet by 8 feet by 8.5 feet high (a "20 foot container"). Larger "40 foot" containers are also commonly used. These metal shipping containers generally have a timber floor, although metal floors and mixed timber and metal floors are also used.

Shipping containers are inspected by relevant authorities for cleanliness, integrity and suitability for the intended cargo before each use to ensure that they meet all the necessary regulations relating to the type of cargo to be carried. Regulations are particularly stringent when the goods are foodstuffs. Containers for foodstuffs must be free from cargo residue, infestation, odour, taint, transferable stains or rust, and flaking or blistering paint. The floor must be clean and dry.

A coating may be applied to the timber or metal floor of a shipping container to facilitate cleaning and overcome some of the problems associated with maintaining the integrity and cleanliness of the flooring. The application of a coating may form part of container refurbishment to upgrade a container for food grade use.

Solvent based coatings have been used on shipping container flooring to help overcome some of the problems associated with maintenance and cleaning of shipping containers. Coatings generally need to be replaced approximately every 12-18 months due to wear and tear. The coating process is time consuming. This has cost implications for the shipping company from the perspective of coating costs in addition to the time that the shipping container is unavailable for use.

In order to minimise the time when the shipping container is unavailable due to refurbishment, it is desirable that the floor coating can be applied quickly and cures as quickly as possible. A coating that cures completely overnight in a closed container is desirable. For this reason solvent based coatings have been used as they cure relatively quickly. A solvent based coating is generally applied to the floor surface by spraying. The application process is time consuming as the container walls must be covered up to prevent overspray. The person applying the coating will require a high level of personal protective equipment as the coating system is solvent based and will be used in a predominantly enclosed environment. It may be necessary to apply several coats to obtain a coating of adequate thickness. Each layer must be allowed to dry before the next layer is applied. These applied coatings may be slow to dry and leave residual, unacceptable odours.

A shipping container with solvent odour is unacceptable for food use, and it may take several days for the residual solvent odour to dissipate, thus extending the refurbishment period. Furthermore, a solvent based coating may be sensitive to water and high temperatures during the curing process, so use in a humid environment or high ambient temperatures may lead to unsatisfactory or unacceptable coatings.

OBJECT OF THE INVENTION

It is an object of the present invention to provide an alternative coating system that overcomes one or more of the problems associated with existing coating systems for the flooring of shipping containers.

SUMMARY OF THE INVENTION

In one aspect, the present invention provides a curing agent for epoxy resins obtained or obtainable by the process of:
  (I) reacting polyamine with salicylic acid; and
  (II) reacting the product of (I) with epoxy resin wherein the epoxy equivalent weight (EEW) of the epoxy resin is from 172 g to 210 g and n is from 0.14 to 0.20;
  to give an amine terminated curing agent wherein the equivalent weight of active hydrogen [EW(H+)] is from 85 g to 105 g.

In another aspect, the present invention further provides a process for preparing an amine terminated curing agent including:
  (I) reacting polyamine with salicylic acid; and
  (II) reacting the product of (I) with epoxy resin wherein the epoxy equivalent weight (EEW) of the epoxy resin is from 172 g to 210 g and n is from 0.14 to 0.20;
  to give an amine terminated curing agent wherein the equivalent weight of active hydrogen [EW(H+)] is from 85 g to 105 g.

The present invention also provides a curing agent for epoxy resins obtainable by the process of:
  (I) reacting at least one polyamine with salicylic acid; and
  (II) reacting the product of (I) with at least one epoxy resin wherein the epoxy equivalent weight (EEW) of the epoxy resin is from 172 g to 210 g and n is from 0.14 to 0.20;
  to give an amine terminated curing agent wherein the equivalent weight of active hydrogen [EW(H+)] is from 85 g to 105 g.

The present invention further provides a curing agent for epoxy resins obtained by the process of:
  (I) reacting at least one polyamine with salicylic acid; and
  (II) reacting the product of (I) with at least one epoxy resin wherein the epoxy equivalent weight (EEW) of the epoxy resin is from 172 g to 210 g and n is from 0.14 to 0.20;

to give an amine terminated curing agent wherein the equivalent weight of active hydrogen [EW(H+)] is from 85 g to 105 g.

Preferably the curing agents of the present invention are amine terminated curing agents.

Preferably the curing agents of the present invention are curing agents for water based epoxy resin systems.

Preferably a polyamine has from two to seven active amine hydrogens. More preferably a polyamine has from three to five active amine hydrogens. In one form a polyamine has at least four active amine hydrogens. In another form a polyamine has four active amine hydrogens.

In one form, preferably a polyamine is a diamine. A preferred class of polyamines are those having two primary amine (—NH$_2$) substituents.

Preferably the polyamine is trimethylhexane-1,6-diamine (TMD). In one aspect the trimethylhexane-1,6-diamine includes a mixture of 1,6-diamino-2,2,4-trimethylhexane and 1,6-diamino-2,4,4-trimethylhexane. In another aspect the trimethylhexane-1,6-diamine comprises a mixture of 1,6-diamino-2,2,4-trimethylhexane and 1,6-diamino-2,4,4-trimethylhexane in approximately equal amounts.

In a further form the polyamine includes at least 75% by weight of trimethylhexane-1,6-diamine and the remainder of the polyamine is selected from one or more of isophoronediamine, ethylenediamine, diethylenetriamine, tetraethylenetetramine, tetraethylenepentamine, propylenediamine, dipropylenetriamine and diethyleneaminepropylene amine.

In a further form the polyamine includes at least 45% by weight of trimethylhexane-1,6-diamine and the remainder of the polyamine is selected from one or more of isophoronediamine, ethylenediamine, diethylenetriamine, tetraethylenetetramine, tetraethylenepentamine, propylenediamine, dipropylenetriamine and diethyleneaminepropylene amine.

In a preferred form the polyamine includes 45% to 54% isophoronediamine in trimethylhexane-1,6-diamine. Preferably the polyamine is 45% to 50% isophoronediamine in trimethylhexane-1,6-diamine. More preferably, the polyamine comprises 46% to 47% isophoronediamine in trimethylhexane-1,6-diamine.

When the polyamine and salicylic acid are combined, preferably the polyamine is added to the salicylic acid. Preferably the salicylic acid is dissolved in a solvent prior to treatment with polyamine. Preferably the ratio of solvent to salicylic acid is approximately 3:1 by weight. Preferably the solvent is butyl glycol ether.

Preferably the molar ratio of salicylic acid to polyamine is from 1:9 to 1:11. More preferably the molar ratio of salicylic acid to polyamine is approximately 1:10. When the polyamine is trimethylhexane-1,6-diamine, preferably the molar ratio of salicylic acid to trimethylhexane-1,6-diamine is from 1:9 to 1:11. More preferably the molar ratio of salicylic acid to trimethylhexane-1,6-diamine is approximately 1:10.

Preferably the epoxy resin is obtained from the reaction of bisphenol and epichlorohydrin. More preferably the epoxy resin is bisphenol A epoxy resin, bisphenol F epoxy resin, or a mixture thereof. In a preferred aspect the epoxy resin is a bisphenol A epoxy resin. Preferably the epoxy equivalent weight (EEW) of the epoxy resin is from 182 g to 192 g. In one form the epoxy resin has an n of approximately 0.15.

Preferably the weight ratio of polyamine to epoxy resin is from 1.8:1 to 2.2:1. Preferably the weight ratio of trimethylhexane-1,6-diamine to epoxy resin is from 1.8:1 to 2.2:1. More preferably the weight ratio of the polyamine to epoxy resin is 1.9:1 to 2.1:1. Most preferably the weight ratio of the polyamine to epoxy resin is approximately 2:1.

Preferably the equivalent weight of active hydrogen [EW(H+)] of the curing agent of the present invention is from 90 g to 95 g. More preferably the curing agent has an equivalent weight of active hydrogen [EW(H+)] of approximately 90 g.

In a further form the present invention provides a curing agent obtainable by the process of:
(I) Dissolving salicylic acid (4.6-4.8% by weight) in butyl glycol ether (14-15% by weight);
(II) adding polyamine (53-55% by weight);
(III) allowing the reaction temperature to reach approximately 45-50° C.; and
(IV) adding epoxy resin (27-28% by weight) at a rate to maintain the reaction temperature at approximately 75-80° C. to give an amine terminated curing agent;
wherein the epoxy resin is bisphenol A epoxy resin, bisphenol F epoxy resin, or a mixture thereof, and has an epoxy equivalent weight (EEW) of from 172 g to 210 g and n of from 0.14 to 0.20; and
wherein the amine terminated curing agent thus formed has an equivalent weight of active hydrogen [EW(H+)] of from 90 g to 95 g.

In a further aspect the present invention provides a process for preparing a curing agent including the steps:
(I) Dissolving salicylic acid (4.6-4.8% by weight) in butyl glycol ether (14-15% by weight);
(II) adding polyamine (53-55% by weight);
(III) allowing the reaction temperature to reach approximately 45-50° C.; and
(IV) adding epoxy resin (27-28% by weight) at a rate to maintain the reaction temperature at approximately 75-80° C. to give an amine terminated curing agent;
wherein the epoxy resin is bisphenol A epoxy resin, bisphenol F epoxy resin, or a mixture thereof, and has an epoxy equivalent weight (EEW) of from 172 g to 210 g and n of from 0.14 to 0.20; and
wherein the amine terminated curing agent thus formed has an equivalent weight of active hydrogen [EW(H+)] of from 90 g to 95 g.

In one form, the polyamine comprises trimethylhexane-1,6-diamine. In a preferred form the polyamine comprises 45% to 54% isophoronediamine in trimethylhexane-1,6-diamine. Preferably the polyamine comprises 45% to 50% isophoronediamine in trimethylhexane-1,6-diamine. More preferably the polyamine comprises 46% to 47% isophoronediamine in trimethylhexane-1,6-diamine.

Preferably the epoxy resin is bisphenol A epoxy resin and has an epoxy equivalent weight (EEW) of from 182 g to 192 g. Preferably the epoxy resin has an n value of approximately 0.15.

In a preferred form the present invention provides a curing agent obtainable by the process of:
(I) Dissolving salicylic acid (4.7% by weight) in butyl glycol ether (14.1% by weight);
(II) adding trimethylhexane-1,6-diamine (53.9% by weight);
(III) allowing the reaction temperature to reach approximately 45-50° C.; and
(IV) adding epoxy resin (27.3% by weight) at a rate to maintain the reaction temperature at approximately 75-80° C. to give an amine terminated curing agent;
wherein the epoxy resin is bisphenol A epoxy resin, bisphenol F epoxy resin, or a mixture thereof, and has an epoxy equivalent weight (EEW) of from 172 g to 210 g and n of from 0.14 to 0.20; and
wherein the amine terminated curing agent thus formed has an equivalent weight of active hydrogen [EW(H+)] of from 90 g to 95 g.

In a preferred form, trimethylhexane-1,6-diamine is replaced by 45% to 54% isophoronediamine in trimethylhexane-1,6-diamine. More preferably, trimethylhexane-1,6-diamine is replaced by 46% to 47% isophoronediamine in trimethylhexane-1,6-diamine.

The curing agents of the present invention have application as curing agents for epoxy resins. The curing agents are suitable for curing water based, solvent based or solvent-free epoxy resin systems. In a preferred aspect the curing agents of the present invention have application as curing agents for water based epoxy resin systems. Preferably a curing agent according to the present invention is formulated as a water based curing composition suitable for curing water based epoxy resin systems.

Accordingly, in a further the present invention also provides a curing composition for a water based epoxy resin composition said curing composition including:
(a) at least one amine terminated epoxy resin curing agent;
(b) butyl glycol ether; and
(c) water.

In another form the present invention provides a curing composition for a water based epoxy resin composition said curing composition including:
(a) at least one amine terminated epoxy resin curing agent;
(b) butyl glycol ether;
(c) salicylic acid; and
(d) water.

In yet another form the present invention provides a curing composition for a water based epoxy resin composition said curing composition including:
(a) at least one amine terminated epoxy resin curing agent;
(b) an emulsifying agent;
(c) butyl glycol ether;
(d) salicylic acid; and
(e) water.

Preferably the emulsifying agent is a nonylphenol alkoxylate emulsifier such as commercially available Termul 200™. Preferably the Termul 200™ is incorporated in liquid form.

Preferably an amine terminated epoxy resin curing agent is a curing agent as hereinbefore defined.

In a further aspect, the present invention also provides a process for preparing a curing agent for epoxy resins comprising:
(I) dissolving salicylic acid (4.6-4.8% by weight) in a solvent (14-15% by weight);
(II) adding trimethyl hexane-1,6-diamine (53-55% by weight);
(II) adding bisphenol A epoxy resin (27-28% by weight) portionwise whilst maintaining the reaction temperature at from 75° C. to 80° C.; and, optionally
(IV) adding one or more further components to modify the properties of the curing agent.

Preferably the solvent is butyl glycol ether.

Preferably trimethylhexane-1,6-diamine is replaced by a mixture comprising 45% to 54% isophoronediamine in trimethylhexane-1,6-diamine. More preferably, trimethylhexane-1,6-diamine is replaced by 46% to 47% isophoronediamine in trimethylhexane-1,6-diamine.

Preferably the bisphenol A epoxy resin has an epoxy equivalent weight (EEW) of from 172 g to 210 g and n is from 0.14 to 0.20.

Preferably the reaction temperature is allowed to reach from 45° C. to 55° C., preferably approximately 45° C., prior to adding the bisphenol A epoxy resin.

Preferably the further components are selected from, for example, solvents, other curing agents, surfactants, fillers, defoaming agents, wetting agents, water and pigments.

The present invention further includes a process for preparing a curing agent as hereinbefore defined.

The present invention also provides a curing composition for curing epoxy resin systems, said curing composition including a curing agent as hereinbefore defined. Preferably the curing composition is water based. In one aspect the epoxy resin system includes one or more epoxy resins formulated as a water based curable epoxy resin composition including one or more additional components selected from organic solvents, pigments, reactive diluents, defoaming agents, wetting agents, surfactants, emulsifiers, dispersants, fillers, viscosity/flow modifiers and suspension agents.

The water based curing composition and the water based curable epoxy resin composition are preferably formulated separately and combined to form a water based epoxy resin coating composition prior to use. Preferably the water based curing composition and the water based curable epoxy resin composition are each formulated such that the combination of approximately one part by volume of the water based curing composition with approximately two parts by volume of the water based curable epoxy resin composition form an epoxy resin coating composition.

Preferably the coating composition is suitable for coating timber or metal flooring such as that found in shipping containers. Preferably the coating composition can be applied by roller or spray application.

Preferably the epoxy resin coating composition is formed by combining a curable epoxy resin composition (Part A) and a curing composition (Part B):
wherein Part A includes a bisphenol A epoxy resin wherein the epoxy equivalent weight (EEW) is from 172 g to 210 g and n is from 0.14 to 0.20; and
wherein Part B includes a curing agent as hereinbefore defined.

Preferably Part A and Part B are each water based compositions.

In a yet further aspect, the epoxy resin coating composition is formed by combining a curable epoxy resin composition (Part A) and a curing composition (Part B):
Wherein:
Part A includes:
(a) at least one bisphenol epoxy resin wherein the epoxy equivalent weight (EEW) is from 172 g to 210 g and n is from 0.14 to 0.20;
(b) at least one reactive diluent;
(c) water;
(d) butyl glycol ether; and
(e) one or more additional components selected from defoaming agents, wetting agents, surfactants, emulsifiers, dispersants, fillers, viscosity/flow modifiers and suspension agents; and wherein:
Part B includes a curing agent as hereinbefore defined.

Preferably Part B is a water based curing composition as hereinbefore defined. Preferably Part A and Part B are each formulated such that the combination of approximately one part by volume of Part B with approximately two parts by volume of Part A form an epoxy resin coating composition suitable for coating the floor of a shipping container. Preferably the epoxy resin coating composition has a weight of solids of from 65% to 75%. More preferably the coating composition has a weight of solids of approximately 70%.

The bisphenol epoxy resin is preferably bisphenol A epoxy resin, bisphenol F epoxy resin, or a mixture thereof. Preferably the bisphenol epoxy resin of Part A has an EEW of from 182 g to 192 g. Preferably the bisphenol epoxy resin has an epoxy percentage of from 22% to 24%, more preferably the bisphenol epoxy resin has an epoxy percentage of from 22.4% to 23.6%.

The present invention also provides an epoxy resin coating composition comprising a curing agent as hereinbefore defined. Preferably the epoxy resin coating composition is water based.

The present invention further provides a water based coating composition including:
(a) a curing agent as hereinbefore defined;
(b) at least one bisphenol epoxy resin; and
(c) water.

Preferably the water based coating composition also includes butyl glycol ether.

Preferably the water based coating composition has a weight of solids of from 65% to 75%. More preferably the water based coating composition has a weight of solids of approximately 70%.

The present invention also provides a cured epoxy resin coating obtained or obtainable by curing an epoxy resin composition including at least one curable epoxy resin with a curing agent as hereinbefore defined. Preferably the curable epoxy resin is a bisphenol epoxy resin. Preferably the curable epoxy resin composition is a curable epoxy resin composition as hereinbefore defined.

Although the application is not so limited, the cured epoxy resin coating has particular application as a coating for the flooring of shipping containers. Accordingly the present invention further provides a method for coating the floor of a shipping container including the steps of:
(I) mixing a water based epoxy resin curing agent with a water based curable epoxy resin composition to give an epoxy resin coating composition;
(II) applying the epoxy resin coating composition to the floor of a shipping container to form a coating; and
(III) allowing the coating thus formed to cure to provide a cured coating.

Preferably the water based epoxy resin curing agent is a curing agent as hereinbefore defined.

There is further provided a method for providing a cured coating for the floor of a shipping container including the steps of:
(I) mixing a water based epoxy resin curing composition with a water based curable epoxy resin composition to give a water based coating composition;
(II) applying the water based coating composition to the floor of a shipping container to form a coating; and
(III) allowing the coating thus formed to cure to provide a cured coating.

Preferably the coating is allowed to cure for approximately 12 hours.

Preferably the water based epoxy resin curing composition is a water based curing composition as hereinbefore defined. Preferably the water based curable epoxy resin composition is a water based curable epoxy resin composition as hereinbefore defined.

Preferably the water based curing composition and the water based curable epoxy resin composition are mixed together by stirring. Preferably mixing is achieved using mechanical stirring.

Preferably the coating composition is applied using a squeegee or lambswool roller in accordance with methods known in the art. Preferably the coating composition is applied in a single coat. Preferably the coating composition has a weight of solids of from 65 to 75%. More preferably the coating composition has a weight of solids of approximately 70%.

Alternatively the coating composition may be applied by spray coating in accordance with known methods.

Preferably the curable coating cures overnight to provide a coating which will withstand passage of vehicles such as forklift traffic.

Preferably the floor of the shipping container is an aluminium or timber substrate. More preferably the floor is made from timber.

In a further aspect the present invention provides a kit for coating a substrate with an epoxy resin coating comprising:
a first sealable container containing a curable epoxy resin composition wherein the first sealable container has sufficient free volume to accommodate the required amount of a curing agent or curing composition to cure the resin; and
a second sealable container containing an amount of a curing agent or a curing composition sufficient to cure the curable epoxy resin composition in the first sealable container.

Preferably the curing agent is a curing agent as hereinbefore defined. Preferably the curing composition is a curing composition as hereinbefore defined.

The present invention further provides a kit for coating a timber floor of a shipping container with an epoxy resin coating comprising:
A first sealable container containing a curable epoxy resin composition wherein the first sealable container has sufficient free volume to accommodate the required amount of a curing agent to cure the resin; and
a second sealable container containing sufficient curing composition to cure the curable epoxy resin composition in the first sealable container;
wherein, in use, the contents of the second sealable container are added to the first sealable container and are combined by mixing to form an epoxy resin coating composition.

Preferably the curable epoxy resin composition and the curing composition are each water based compositions.

Preferably the water based epoxy resin composition is a water based epoxy resin composition as hereinbefore defined.

Preferably the curing composition is a water based curing composition as hereinbefore defined.

Preferably the water based curable epoxy resin composition and the water based curing composition are each formulated such that one part by volume of the water based curing composition will cure two parts by volume of the water based curable epoxy resin composition to form a coating for a floor of a shipping container.

In one aspect the kit contains a tool for applying the epoxy coating composition. In another aspect the kit includes a tool for stirring the epoxy coating composition to effect mixing. Preferably the tool is a mechanical mixer, a shear blade mixer or a flat blade stirrer.

When used herein the term "polyamine" refers to an organic compound having two or more primary amine ($—NH_2$) groups. When used herein, a polyamine is a liquid at ambient conditions and may be linear, branched or cyclic. Polyamines may be used to crosslink epoxy resins resulting in curing or hardening of the resin.

Polyamines are readily available from commercial sources such as BASF SE; CTP Polymers and Technologies for Polymers GmbH; Air Products and Chemicals, Inc; and Huntsman Chemical Company. Examples of polyamines include 3-aminomethyl-3,5,5-trimethylcyclohexylamine, ethylenediamine, diethylenetriamine, tetraethylenetetraamine, tetraethylenepentamine, propylenediamine, dipropylenetriamine, diethyleneaminepropylene amine and trimethylhexane-1,6-diamine.

A preferred polyamine has two primary amine (—NH$_2$) groups. A particularly preferred polyamine is trimethylhexane-1,6-diamine (TMD). TMD has an active H equivalent weight [EW(H+)] of 39.6 g. TMD may comprise one or more isomers. In one form TMD may be a mixture of 1,6-diamino-2,2,4-trimethylhexane and 1,6-diamino-2,4,4-trimethylhexane in approximately equal proportions. In an alternative form the polyamine is 3-aminomethyl-3,5,5-trimethylcyclohexylamine (isophoronediamine). In a preferred form the polyamine comprises 45% to 54% isophoronediamine in trimethylhexane-1,6-diamine.

When used herein the term "epoxy resin" refers to reactive pre-polymers and polymers containing oxirane groups. An epoxy resin is cured by reacting it with a curing agent to effect crosslinking through the oxirane groups.

A particular class of commercially available epoxy resins are prepared through the reaction of a bisphenol such as bisphenol A or bisphenol F with epichlorohydrin to give bisphenol A epoxy resin and bisphenol F epoxy resin respectively. Variation of the ratio of the bisphenol to epichlorohydrin produces epoxy resins with different physical properties and characteristics. Bisphenol A epoxy resin and bisphenol F epoxy resins having a range of physical properties are readily available from commercial manufacturers such as Shell Chemical Company (Momentive Specialty Chemicals), Dow Chemical Company and others under trade names such as D.E.R®, EPON®, EPOTUF® and EPIKOTE®.

When used herein the term "epoxy equivalent weight" or [EEW]" is the weight of epoxy resin in grams containing one equivalent of oxirane group. The EEW can be determined by known methods, such as through the reaction of the epoxy resin with a hydrogen halide such as HCl, HBr or H$_2$I$_2$, see e.g. Swern, D., *Analytical Chemistry* (1947) 19, 414; Lee, H. & Neville, K., *Handbook of Epoxy Resins* (1967) New York, McGraw Hill Book Company; and Jungnickel, *Organic Analysis, Vol* 1, (1953) 127-154, New York, Interscience Publishers.

When used herein, the term "active H equivalent weight" or [EW(H+)] is the weight of curing agent in grams containing one equivalent of active hydrogen atom. The EW(H+) for a curing agent can be determined by known methods, for example by calculation or by chemical evaluation. The EW(H+) for a curing agent can be evaluated, for example, by reacting a known mass of curing agent with lithium aluminium hydride and measuring the amount of hydrogen gas evolved according to known procedures, see, e.g. King, G, *Nature* (1949) 164 706; Sovcek, M., *Chemistry* (1959), 50, 323; Stenmark, G. A. & Weiss, F. T., *Analytical Chemistry* (1956) 28, 1784; Ulbrich, V. & Makes, J., *Chemicky Prumysl*. (1958) 8 183.

When used herein, the term n denotes the number of polymerised subunits in the epoxy resin.

When used herein, unless otherwise defined, percentages are percentages by weight.

Epoxy resin compositions may contain one or more additional components to modify the resin properties. Examples of classes of additives for epoxy resins are well known in the art and are readily available from commercial manufacturers. Additives may be selected from, for example, organic solvents, water, pigments, defoaming agents, reactive diluents, wetting agents, surfactants, emulsifiers, dispersants, fillers, viscosity/flow modifiers and suspension agents.

The term "water based" is well understood in the art of paint and coating technologies. Water based formulations when referred to herein include water as a main diluent.

Volatile organic compounds (VOCs) are organic compounds having a high vapour pressure at ambient temperatures and pressures. Circumstances surrounding the use of certain VOCs are regulated by law. Legislation relating to VOCs varies according to the jurisdiction. Accordingly the definition of "low VOC" also varies according to the jurisdiction and the circumstances surrounding use.

EXAMPLES

The following examples illustrate the invention, but are not intended as a limitation thereof.

Salicylic acid, diacetone alcohol, dioctyl phthalate and butyl glycol ether (2-butoxyethanol) are readily available from commercial suppliers.

Bisphenol A epoxy resins, bisphenol F epoxy resins and bisphenolA/bisphenol F epoxy resins with epoxy equivalent weight (EEW) from 172 to 210 g and n of from 0.14 to 0.20 are commercially available. Examples include D.E.R. 331™, available from the Dow Chemical Company, EPIKOTE™ and EPOTUF™ from Momentive Specialty Chemicals, Araldite™ from Huntsman Chemical Company and BEKOPDX™ from Cytec Industries Inc.

The polyamine trimethylhexane-1,6-diamine (TMD) is commercially available from, for example, CTP Polymers and Technologies for Polymers GmbH and Huntsman Chemical Company. Commercially available TMD may comprise a mixture of isomers. For example TMD may include a mixture of 1,6-diamino-2,2,4-trimethylhexane and 1,6-diamino-2,4,4-trimethylhexane.

The polyamine 3-aminomethyl-3,5,5-trimethylcyclohexylamine (isophoronediamine) is commercially available from, for example, BASF SE.

Termul™ 200 is a nonylphenol alkoxylate emulsifier available from the Huntsman Chemical Company.

Additives for epoxy resins such as curing agents, reactive diluents, pigments, defoaming agents, wetting agents, surfactants, emulsifiers, dispersants, fillers, viscosity/flow modifiers and suspension agents are known in the art and are readily available from commercial sources. Examples of commercial manufacturers of additives include Adeka Corporation, BASF SE, BYK-Chemie, Southern Clay Products, Bernd Schwegmann GmbH & Co KG, Dow Chemical Company, Huntsman Chemical Company, Dow Chemical Company, Shell Chemical Company (Momentive Specialty Chemicals) and Dow Corning Corporation.

Physical characteristics such as weight and volume of solids; specific gravity; viscosity; volatile organic compound concentration; pigment concentration; extender concentration; binder concentration; and pigment volume concentration were determined using conventional techniques well known in the art.

Example 1

Preparation of Amine Terminated Curing Agent

Salicylic acid (5.012 kg) was dissolved in butyl glycol ether (15.036 kg). Polyamine [trimethylhexane-1,6-diamine (TMD, 57.64 kg] was added. When the reaction temperature reached >45° C., bisphenol A epoxy resin (EEW from 172 to 210 g, n=0.14-0.20, 11.862 kg) was added. The reaction temperature was allowed to drop to 75-80° C. and a further portion of epoxy resin (3.475 kg) was added. A further four portions of epoxy resin (3.475 kg each) were added. The reaction temperature was allowed to drop to 75-80° C. before the addition of each portion of epoxy resin. The total amount of bisphenol A epoxy resin added was 29.237 kg.

The resulting product was a clear, colourless liquid. The equivalent weight of active hydrogen [EW(H+)] was 90-95 g.

Variation of the amount of salicylic acid by +/−2.5% or butyl glycol ether by +/−2.5% has no appreciable effect on the properties or performance of the resulting curing agent.

Variations of the amine terminated curing agent of Example 1 have been prepared using the same method as described in Example 1 with the partial replacement of 45% to 54% of the trimethylhexane-1,6-diamine by isophorone-diamine.

Example 1A

Preparation of Amine Terminated Curing Agent

An amine terminated curing agent was prepared in accordance with the method of Example 1 using a mixture of 53.3% trimethylhexane-1,6-diamine and 46.7% isophorone-diamine instead of 100% trimethylhexane-1,6-diamine.

The particular form of amine terminated curing agent produced using the 53.3% trimethylhexane-1,6-diamine and 46.7% isophoronediamine polyamine mixture imparts particularly good physical properties when used as a curing agent for epoxy resins as described herein.

The curing agent of Examples 1 and 1A have application as curing agents for epoxy resins. A curing agent according to the present invention can be combined, if desired, with other curing agents to modify properties of the curable resin such as curing rate and curing temperature or optimise certain properties of the cured resin such as adhesion, flexibility and chemical resistance. The curing agent can be formulated as a curing composition of a two part epoxy resin system. The curing agents of Examples 1 and 1A can be formulated as a water based curing composition.

Example 2

Preparation of Water Based Curing Composition (Hardener, Part B) Termul 200 (emulsifier, 8 kg) was melted and added under stirring to the product of Example 1. Water (94.982 kg) was added, followed by butyl glycol ether (47.034 kg), Dowanol PnB (diluent, 5.612 kg), Schwego Fluor 6238 (surfactant, wetting agent, 0.281 kg), Schwego Flow 8058 (flow aid, 2.806 kg) and Dow Corning Additive 65 (defoamer, 0.112 kg).

Total mass of water based curing composition: 261.71 kg; volume: 272.558 Liters; specific gravity (25° C.) 0.9604.

Accordingly, the curing composition (Part B) comprises the following:

(Percentages are by Weight)
1. Butyl glycol ether (15.036 kg, 5.744%);
2. Salicylic acid (5.012 kg, 1.915%);
3. Trimethylhexane-1,6-diamine (57.640 kg, 22.019%);
4. Bisphenol A epoxy resin (29.24 kg, 11.17%);
5. Termul 200 (8.0 kg, 3.056%);
6. Water (90.998 kg, 34.762%);
7. Butyl glycol ether (47.037 kg, 17.969%);
8. Dowanol PnB (5.612 kg, 2.144%);
9. Schwego Fluor 6238 (0.281 kg, 0.107%);
10. Schwego Flow 8058 (2.806 kg, 1.072%); and
11. Dow Corning Additive 65 (0.112 kg, 0.043%).

Weight of solids: 38.696%; Volume of solids: 38.317%; Specific gravity (25° C.): 0.9604 g/cm³; Volatile organic compound content: 248.332 g/L.

Example 2A

Preparation of Water Based Curing Composition (Hardener, Part B)

A water based curing composition (Hardener, Part B) was prepared in accordance with the method of Example 2 using the product of Example 1A prepared from a mixture of 53.3% trimethylhexane-1,6-diamine and 46.7% isophorone-diamine instead of 100% trimethylhexane-1,6-diamine.

The Part B (hardener) of Example 2A has enhanced shelf stability in addition to good low temperature curing properties.

It will be appreciated that variation in the ratios of components can alter characteristics of the curing compositions (Part B) of Examples 2 and 2A and subsequent curable compositions and cured coatings. No significant effect on the properties of Part B would be expected if the component ratios are varied within 1%.

Wetting agent/surfactant Schwego Fluor can be replaced by surfactant BYK 349 without affecting the properties of Part B.

The curing compositions (Hardeners) of Examples 2 and 2A have application in curing water based epoxy resins.

Example 3

Preparation of Water Based Epoxy Resin (Part A)

The following were added in the given order under high shear mixing:

(Percentages are by Weight)
1. Bisphenol A epoxy resin [EEW 172 to 210 g, n=0.14-0.20], (200 kg, 22.415%);
2. Adeka ED523T (reactive diluent), (30 kg, 3.362%);
3. Di octyl phthalate (6 kg, 0.672%);
4. BYK 022 (defoamer) (2.5 kg, 0.280%);
5. Butyl glycol ether (solvent) (12 kg, 1.345%); and
6. Schwego Fluor 6238 (wetting agent) (2.5 kg, 0.280%).

The mixture was mixed at high speed for 10 minutes.
7. Termul 200 (emulsifier) (13.5 kg, 1.513%) was heated until liquid and added.

The mixture was mixed at high speed for 10 minutes.
8. Water (13 kg, 1.457%) was added over a period of 15 minutes and the emulsion was allowed to stabilize for 30 minutes.

The following components were then added slowly in the following order:
9. Black oxide powder BA33 (60 kg, 6.725%));
10. Red oxide powder RA11 (30 kg, 3.362%);
11. Yellow oxide powder (30 kg, 3.362%);
12. Minbar 45B (barium sulphate), (125 kg, 14.01%);
13. Silica 300 g (silicon dioxide) (200 kg, 22.416%); and
14. Attagel 50 (rheological modifier) (13 kg, 1.457%).

The mixture was dispersed at high speed for 20 minutes.
The following components were premixed then added slowly to the bulk:
15. Diacetone alcohol (7 kg, 0.785%);
16. Butyl glycol ether (20 kg, 2.242%); and
17. Water (123.734 kg, 13.868%).

Finally the following components were added:
18. Optiflow H600 (1 kg, 0.112%); and
19. Optiflow L100 (3 kg, 0.336%).

Total mass of water based epoxy resin composition: 892.234 kg; volume: 545.117 Liters; weight of solids:

79.721%; volume of solids: 65.947%; specific gravity (25° C.): 1.636775 g/cm$^3$; volatile organic compound content: 71.544 g/L; Pigment concentration 220.136 g/L; extender concentration: 596.202 g/L; binder concentration: 421.928 g/L; pigment volume concentration: 50.448 cm$^3$/L.

It will be appreciated that variation in the ratios of components can alter characteristics such as rheology or flow of the coating composition in addition to altering the degree of opacity of the cured coating and affect the rheology.

Variations of component ratios within the following limits should not affect the properties of Part A:
epoxy resin +/−2.5%;
reactive diluent +/−2.5%;
other liquids +/−5%;
powders +/−10%;
pigment +/−5%; and
water +/−5%.

Wetting agent/surfactant Schwego Fluor can be replaced by surfactant BYK 349 without affecting the properties of Part A.

Part A (140 ml) and Part B (70 ml) when mixed to form a curable epoxy resin composition has a working time of approximately 40-50 minutes. The curing time of the coating is approximately 12 hours in ambient conditions of 5° C. to 40° C. and high humidity.

Example 4

Preparation and Application of Water Based Coatable Epoxy Resin

Part A (Example 3) and Part B (Example 2) were mixed in the ratio of 2:1 by volume. Mixing was achieved by mechanical mixing, or by hand mixing using a flat stirrer.

Weight of solids: 70.415%; volume of solids: 56.738%; specific gravity (25° C.): 1.411 g/cm$^3$; viscosity (25° C., Ford cup #4): 79.9 s; viscosity (25° C., Ford cup #5): 57.5 s; volatile organic compound concentration: 130.476 g/L: pigment concentration: 146.757 g/L; extender concentration: 397.468 g/L; binder concentration: 387.534 g/L; pigment volume concentration: 33.632 g/L.

The curable coating resin thus formed was applied to a timber floor of a shipping container using a squeegee/spike roller or a lambswool roller.

The butyl glycol ether solvent evaporates from the coating, and forms an azeotrope to remove residual water. This provided an opaque brown epoxy coating of approximately 90 micron dry film thickness. This is sufficient to cover stains and fill screw holes and other minor irregularities in the floor surface. The formulation cured overnight (approximately 12 hours) to give a hard film. Overnight curing was achieved at temperatures from 5° C. to 40° C.

Example 4A

Preparation and Application of Water Based Coatable Epoxy Resin

Part A (Example 3) and Part B (Example 2A) were mixed in the ratio of 2:1 by volume and applied to a timber floor of a shipping container according to the method described in Example 4.

After overnight curing the coatings of Example 4 and Example 4A can withstand forklift traffic and mechanical wear and tear. After five days the coatings exhibit optimum mechanical properties. The coating of Examples 4 and 4A seal, colour and protect the timber flooring.

The cured coatings are flexible, non-flaking, chemical resistant and tough. The cured coatings withstand the passage of a vehicle such as a fork lift truck during loading and unloading of the shipping container. The resulting cured coatings are believed to be suitable for food contact in accordance with the requirements of the US Food and Drug Administration in accordance with the *Code of Federal Regulations Title* 21, Volume 3, Part 175, section 300 (Resinous and Polymeric Coatings).

The water based coatable epoxy resin of Example 4A has superior physical properties which further facilitate easy application by roller. The resin also has superior curing properties.

The advantageous properties of the curable coating resin and the cured coatings are believed to be attributable, at least in part, to the amine terminated curing agents of the present invention.

Approximately 2.8 liters of a curable water based epoxy resin coating composition prepared by combining one part (by volume) of Part B (Example 2) and two parts (by volume) of Part A (Example 3) will coat the timber floor of a 20 foot shipping container (approximately 14 m$^2$) to a dry film thickness of 90 microns in a single coat.

A 2.8 liter kit for coating the floor of a 20 foot shipping container includes a sealable container of a volume of at least 3 liters containing 1.867 liters of Part A (Example 3) and a sealable container containing 0.933 liters of Part B (Example 2).

Part B is added to the container of Part A and the mixture is mixed mechanically or by hand to give a water based curable epoxy resin coating composition. This coating composition is then applied to the floor of a 20 foot shipping container using an applicator such as a squeegee or lambswool roller. This volume is sufficient to cover the floor of the container (approximately 14 m$^2$) to a 90 micron dry film thickness without wastage.

Similarly, two ×2.8 liter kits can be used for coating the floor of a 40 foot shipping container.

ADVANTAGES

An advantage of the preferred embodiment of the present invention is that the amine terminated curing agent is suitable for formulating in a water based curing composition which can be used to cure water based epoxy resin coating systems.

The amine terminated curing agent is believed to impart good physical properties when formulated as a curing composition for water based epoxy resins. Epoxy resin coating compositions as described herein including the curing agent have superior properties which facilitate easy application by roller. The applied coatings have good curing characteristics under a variety of environmental conditions. The resulting cured coatings have good physical properties.

The epoxy resin coating system according to the preferred embodiment is suitable for coating in conditions of high relative humidity and, unlike solvent based polyurethane resins, is not sensitive to blushing. The coating system is applicable over a wide range of temperatures and is completely curable down to ambient temperatures of 5° C.

An advantage of the preferred embodiment of the water based epoxy resin coating is that a floor substrate of a shipping container can be refurbished quickly and economically under a wide variety of environmental ambient conditions. The shipping container is out of circulation for a short period of time.

The coating resin is simple to mix and apply. No specialised training is required.

The level of personal protective equipment required is lower than would be required for a solvent based coating system.

The preferred embodiment of the coating resin can be applied to a timber floor using a roller or squeegee. A coating of sufficient thickness can be achieved with a single coat applied with a roller, so multiple coats are not required to achieve the required degree of coverage. Although the coating can be applied by spraying, there is no need for spray application. Accordingly it is not necessary to tape up the walls of the container to protect them from overspray.

The applied coating is quick to cure. There is a sufficient degree of curing overnight to allow passage of forklift traffic over the floor of the shipping container without causing damage to the coated floor surface. This further minimises the time that the container is out of circulation and unavailable for use.

There is a low VOCC (volatile organic compound content) associated with the coating process using the preferred embodiment of the water based coatable epoxy resin of the present invention. It is a low emission process. There is no perceptible residual or lingering odour after overnight curing.

The applied coating adheres to various grades and types of timber, so it is suitable for use on mixed timber flooring commonly found in container floors. The coating also adheres to aluminium alloy commonly used for flooring of refrigerated shipping containers.

The cured coating provides a sealing and protective surface to the substrate. In a preferred embodiment the coating can be coloured.

The cured coating is flexible, non-flaking, chemical resistant and tough. It is suitable for use in containers for food transportation such as shipping containers and food delivery trucks. The curable coating resin is also suitable for other applications, and can be used to coat surfaces such as flooring of food preparation areas, abattoirs and the like.

The advantageous handling and application properties of the curable coating resin, the curing properties and the physical properties of the cured coating are believed to be attributable, at least in part, to the amine terminated curing agents of the present invention.

A two part water based epoxy resin may be provided in a kit form with sufficient quantities of Part A and Part B to coat the floor of a 20 foot shipping container to the correct coating thickness. No measuring of the components is required, and there is no waste resin or resin components to store or dispose of. The mixing process is simple and requires no measuring. The application process is straightforward and requires no specialised skills or training.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:

1. A curing agent for epoxy resins obtained by the process of:
   (I) reacting polyamine with salicylic acid wherein the polyamine has two primary amine groups; and
   (II) reacting the product of (I) with epoxy resin wherein the epoxy equivalent weight (EEW) of the epoxy resin is from 172 g to 210 g and n is from 0.14 to 0.20;
   to give an amine terminated curing agent wherein the equivalent weight of active hydrogen [EW(H+)] is from 85 g to 105 g.

2. A curing agent according to claim 1 wherein the polyamine is trimethylhexane-1,6-diamine.

3. A curing agent according to claim 1 wherein the polyamine is 45% to 50% by weight isophoronediamine in trimethylhexane-1,6-diamine.

4. A curing agent according to claim 1 wherein the molar ratio of salicylic acid to polyamine is 1:9 to 1:11.

5. A curing agent according to claim 1 wherein the weight ratio of polyamine to epoxy resin is 1.9:1 to 2.1:1.

6. A water based curing composition for a water based epoxy resin composition, said curing composition including an amine terminated epoxy resin curing agent according to claim 1.

7. A water based curing composition for a water based epoxy resin composition said curing composition including:
   (a) an amine terminated epoxy resin curing agent according to claim 1;
   (b) butyl glycol ether; and
   (c) water.

8. A water based epoxy resin coating composition including a water based curing composition according to claim 7.

9. A water based epoxy resin coating composition formed by combining a curable epoxy resin composition (Part A) and a curing composition (Part B) wherein the Part B is a curing composition according to claim 7.

10. A kit for coating a substrate with an epoxy resin coating comprising:
    a first sealable container containing a curable epoxy resin composition wherein the first sealable container has sufficient free volume to accommodate the required amount of a curing agent or curing composition to cure the resin; and
    a second sealable container containing an amount of a curing composition according to claim 8, sufficient to cure the curable epoxy resin composition in the first sealable container.

11. A water based epoxy resin coating composition including a curing agent according to claim 1.

12. A kit for coating a substrate with an epoxy resin coating comprising:
    a first sealable container containing a curable epoxy resin composition wherein the first sealable container has sufficient free volume to accommodate the required amount of a curing agent or curing composition to cure the resin; and
    a second sealable container containing an amount of a curing agent according to claim 1 sufficient to cure the curable epoxy resin composition in the first sealable container.

* * * * *

UNITED STATES PATENT AND TRADEMARK OFFICE
CERTIFICATE OF CORRECTION

PATENT NO. : 9,988,486 B2
APPLICATION NO. : 14/780207
DATED : June 5, 2018
INVENTOR(S) : Andrzej Pokorski Page 1 of 1

It is certified that error appears in the above-identified patent and that said Letters Patent is hereby corrected as shown below:

In the Claims

Column 16, Claim 10, should read:
10. A kit for coating a substrate with an epoxy resin coating comprising:
a first sealable container containing a curable epoxy resin composition wherein the first sealable container has sufficient free volume to accommodate the required amount of a curing agent or curing composition to cure the resin; and
a second sealable container containing an amount of a curing composition according to claim 7, sufficient to cure the curable epoxy resin composition in the first sealable container.

Signed and Sealed this
Fifth Day of March, 2019

Andrei Iancu
*Director of the United States Patent and Trademark Office*